United States Patent Office 3,458,479
Patented July 29, 1969

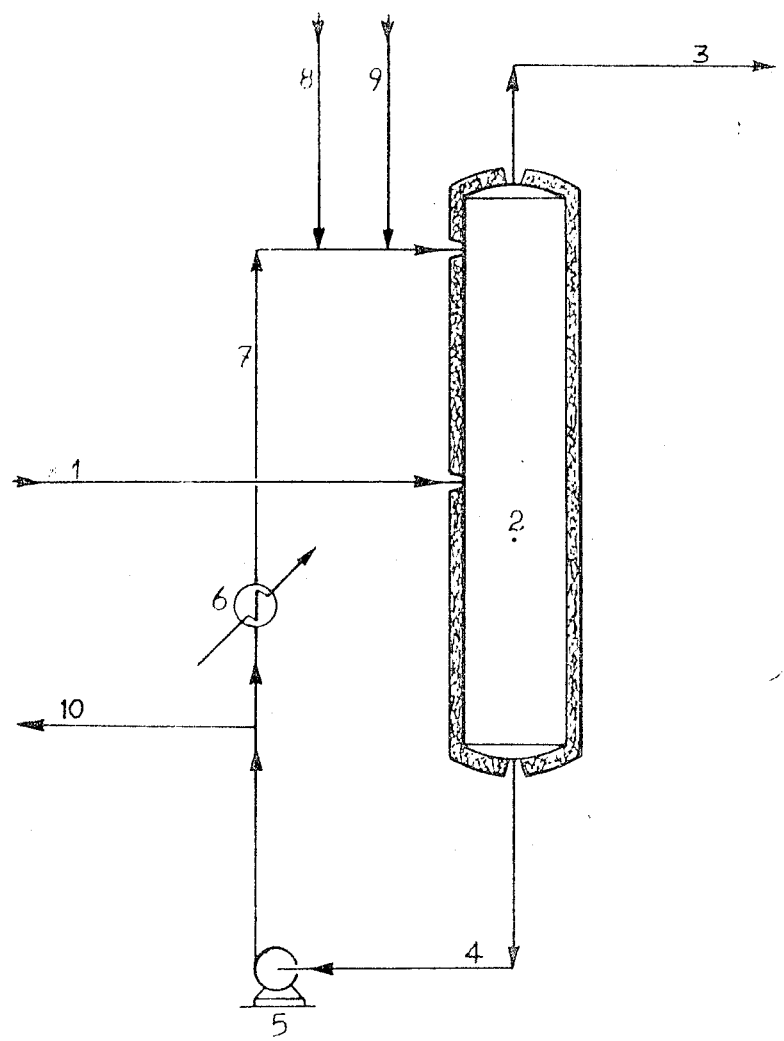

3,458,479
METHOD OF POLYMERIZING GASEOUS FORMALDEHYDE
Luigi Lugo and Cesare Reni, Milan, Italy, assignors to Società Italiana Resine S.p.A., Milan, Italy
Filed Mar. 31, 1967, Ser. No. 627,362
Claims priority, application Italy, Apr. 2, 1966, 7,510/66
Int. Cl. C08g 1/02
U.S. Cl. 260—67                                              4 Claims

ABSTRACT OF THE DISCLOSURE

A method of polymerising gaseous formaldehyde which is continuously carried out by introducing formaldehyde into a tower through which a suspension of polyformaldehyde in an inert liquid, flows in a downward direction. Enriched polymer suspension is removed at the bottom of the tower and part of this is recycled to the top of the tower. The recycled portion is suitably diluted with the inert liquid.

---

Formaldehyde polymers of high molecular weight have been prepared by H. Staudinger who described them in "Die Hochmolekularen organischen Verbindungen" Julius Springer, Berlin 1932, by the name of "eupolyoxymethylenes." They are distinguished from other polymers of formaldehyde by their properties of toughness, stability and high molecular weight. In addition to describing polymerisations in the absence of catalysts Staudinger suggested the use of aliphatic amines as suitable catalysts for the formation of eupolyoxymethylenes. Following Staudinger's work polymerisation processes of formaldehyde were reported in the presence of catalysts comprising aromatic cyclo-aliphatic amines or hydrazines or hydrocarbon substituted arsines, phosphines or stibines. However all these polymers yield polymers with an irregular distribution of molecular weights.

An object of the present invention is to provide a process of polymerising formaldehyde yielding polymers having a regular distribution of the molecular weights although using previously known catalysts. A further object of the invention is to carry out the polymerisation reaction in an extremely simple apparatus without the need for mechanical stirrers. A further object of the invention is to provide controlled conditions such that the heat of reaction can be dissipated outside the reactor.

According to the invention we provide a method of polymerising gaseous formaldehyde comprising introducing the reagent gas essentially consisting of formaldehyde into the top of a cylindrical tower through which a polyformaldehyde suspension in an inert liquid medium flows downwardly, withdrawing polymer enriched suspension from the reactor bottom and recycling it in part to the top of the tower after flow through a heat exchanger in order to remove at least part of the reaction heat.

A fundamental advantage deriving from the use of the invention is that the distribution of molecular weights may be satisfactorily controlled. It is well known in the art that when operating a continuous process it is essential to obtain polymers having a regular distribution of molecular weights in order to avoid anomalous behavior on extrusion (caused by great differences in average molecular weight which influencences viscosity in a molten condition) and varying mechanical properties also due to differences in average molecular weight.

A further advantage of the invention lies in the considerable reduction in fouling of the reactor walls thereby eliminating frequent cessation of operation for cleaning.

This is of particular interest since formaldehyde normally polymerises on any surface, more particularly if it is cooled, forming very hard bulky deposits which generally lead to unacceptable degeneration of exchange coefficients and blocking of pipes and valves. Thus normally frequent interruptions for cleaning purposes are required.

The invention will now be described by way of example with reference to the accompanying drawing in which FIGURE 1 diagrammatically shows the apparatus for carrying out the invention.

The reactor 2 is a stainless steel tower the walls of which are provided with thick heat insulation or a jacket for circulating cooling or heating liquid.

Previously purified gaseous formaldehyde is continuously supplied through inlet 1 to the reactor 2 which contains a previously formed polymer mixture suspended in an inert liquid medium which does not react with formaldehyde. The contents of reactor 2 are continuously removed through a pipe 4 by a pump 5. Part of this removed suspension is recycled to the top of the reactor 2 through a pipe 7 and heat exchanger 6 which removes the reaction heat and another part, substantially corresponding to the quantity of polymer formed on introduction of the gaseous formaldehyde, is continuously removed through pipe 10. Make-up solvent and the selective catalyst may be supplied through pipes 8 and 9 respectively. Unreacted formaldehyde and any inert gases mixed therewith are removed from the reactor through pipe 3.

The fact that in the method of the present invention there is a very large surface area of small polymer particles available for contact with the gaseous formaldehyde is believed to be one of the reasons for the drastic decrease in fouling of the reactor.

By recycling the reactor contents the high reaction heat (about 800 kcal./kg.) can be removed through a heat exchanger arranged externally of the reactor. Thus the importance of heat exchange through the walls of the reactor is reduced and the necessity for cooling the walls of the reactor is avoided. This is a further reason why fouling is reduced.

Regular distribution of the molecular weights of the resulting polymer is presumably effected by the strict temperature control. Moreover contact of the gaseous formaldehyde with all the many polymer particles aids the formation of polymer chains each growing uniformly in length. Thus there is controlled formation of fresh polymerisation centers by adjustment of the quantity of initiator continuously fed to the reactor, and uniform growth of polymer chains through control of the reaction rate by controlling the temperature and contacting monomeric formaldehyde with all the polymer particles by circulating the suspension.

Operation can be carried out within wide temperature ranges e.g. from −80 to +80° C. for an easily controllable polymerisation rate. These temperatures permit the use of conventional heat dispersing means employing water, brine and liquified ammonia.

The polymer concentration in the suspension may amount up to 100 g./l.; at higher concentrations the viscosity of the mass becomes too high and circulating difficulties arise. There is no lower concentration limit for the solid in suspension; however the lowest limit is preferably 25 g./l. in order to avoid an excessive amount of liquid to be separated from the polymer.

It has been found that the circulating rate may be adjusted in order to renew the reactor contents 2 to 10 times per hour. The suspension circulation rate should preferably be adjusted to cause the monomeric formaldehyde introduced into the reactor to polymerise before it reaches the pipings and external heat exchanger, thereby avoiding possible polymerisations on the walls of said apparatus. However the circulation rate should not be so low as to lead to settling of the formed polymer anywhere in the reactor or circulating circuit and ensueing blocking of pipes.

What we claim is:

1. In a process for the polymerization of formaldehyde which comprises introducing a reagent gas consisting essentially of gaseous formaldehyde into a cylindrical tower reactor wherin a polyformaldehyde suspension is down-flowing, and the gaseous formaldehyde is reacted to polyformaldehyde and withdrawn from the bottom of the reactor in the form of a polyformaldehyde enriched suspension which is cooled by passage through heat exchange means arranged externally of the reactor, said polyformaldehyde being partially recycled to said reactor, the improvement which comprises:
   (a) introducing said gaseous formaldehyde directly into the mass of the downflowing polyformaldehyde suspension;
   (b) maintaining the polyformaldehyde concentration in the suspension between about 25 to about 100 grams per liter while substantially completely polymerizing the formaldehyde while in the cylindrical tower reactor;
   (c) recycling the polyformaldehyde suspension at such a rate that the contents of the reactor are fully changed from about 2 to about 10 times per hour.

2. A process as claimed in claim 1, in which said tower is formed of stainless steel.

3. A process as claimed in claim 1 in which said portion of said enriched suspension which is recycled is diluted by the addition of an inert liquid medium.

4. In a process for the polymerization of formaldehyde which comprises introducing a reagent gas consisting essentially of gaseous formaldehyde into a cylindrical tower reactor wherein a polyformaldehyde suspension is downflowing and the gaseous formaldehyde is reacted to polyformaldehyde and withdrawn from the bottom of the reactor in the form of a polyformaldehyde enriched suspension which is cooled by passage through an external heat exchanger and partially recycled to the reactor after withdrawal, the improvement which comprises:
   (a) introducing said gaseous formaldehyde directly into the mass of the downflowing polyformaldehyde suspension, said polyformaldehyde suspension being carried in an inert liquid medium;
   (b) maintaining the polyformaldehyde concentration in the suspension between about 25 to about 100 grams per liter while substantially completely polymerizing the formaldehyde while in the cylindrical tower reactor;
   (c) recycling the polyformaldehyde suspension at such a rate that the contents of the reactor are fully changed from about 2 to about 10 times per hour.

References Cited

UNITED STATES PATENTS

| 3,091,599 | 5/1963 | Jean | 260—67 |
| 3,182,038 | 5/1965 | Smoot | 260—67 |
| 3,281,395 | 10/1966 | Fukita et al. | 260—67 |
| 3,285,877 | 11/1966 | Kocher et al. | 260—67 |

FOREIGN PATENTS 1,285,909  1/1962  France.

WILLIAM H. SHORT, Primary Examiner

L. M. PHYNES, Assistant Examiner